Patented Dec. 29, 1936

2,066,153

UNITED STATES PATENT OFFICE 2,066,153

CATALYTIC COMPOSITION AND PROCESS FOR PREPARING SAME

Wilbur A. Lazier, Marshallton, Del., assignor to E. I. du Pont de Nemours & Company, Wilmington, Del., a corporation of Delaware No Drawing. Original application July 23, 1930, Serial No. 470,238. Divided and this application December 31, 1931, Serial No. 584,293

20 Claims. (Cl. 23—237)

This invention relates to novel catalyst compositions and processes for preparing the same, and more particularly the invention relates to promoted chromite catalysts which are especially suitable for the carrying out of organic hydrogenation and dehydrogenation reactions.

This case is a division of my copending application Serial No. 470,238, filed July 23, 1930 now Patent 1,964,001. It is also a continuation in part of my copending applications Serial No. 285,501, filed June 14, 1928, now Patent 1,857,921, and Serial No. 445,224, filed April 17, 1930.

The rapid development of technically successful processes of synthesizing useful organic compounds from water gas has led to the proposed use of numerous combinations and mixtures of various catalytic metals and metallic oxides. In general, such catalyst compositions as have been suggested have consisted of two or more elements or compounds in the form of intimate physical mixtures, such as those formed by the coprecipitation of hydroxides or salts. A typical and widely used catalyst of this type is prepared by co-precipitating a mixture of zinc hydroxide and chromium hydroxide with a base, or by mixing chromic acid with an excess of zinc oxide. According to U. S. Patent 1,746,782 issued to me on February 11, 1930, particularly useful catalyst compositions are obtained by igniting at a red heat chromates of various hydrogenating metals to form chromites containing the hydrogenating metal oxide partially combined with chromium sesqui-oxide to form loosely bound but very refractory compounds of indefinite chemical composition which may be classified under the term "chromites".

Another convenient method of preparing these important chromite catalysts consists of heating a double salt of a hydrogenating metal and a nitrogen base, such as ammonia, to its spontaneous decomposition temperature, as disclosed in Patent 1,746,783. For example, basic zinc ammonium chromate when heated to 400° C. undergoes an exothermic gaseous decomposition resulting in a finely divided, powdery, black residue of zinc chromite containing free zinc oxide as well as zinc oxide combined with chromium sesqui-oxide. These simple chromite compositions when used alone as catalysts for various organic hydrogenation and dehydrogenation reactions, have been found to be particularly effective. However, so far as I am aware, no mixed or promoted multiple chromite catalysts containing a plurality of chromites of hydrogenating metals have been developed or applied in such catalytic hydrogenations or dehydrogenations previous to my invention.

This invention has as an object to provide a new catalyst composition which is particularly effective in catalyzing a variety of organic chemical reactions, especially those involving the hydrogenation of unsaturated carbon compounds, the dehydrogenation of oxygenated organic compounds, such as the alcohols and other hydrogenations and dehydrogenations in general. A further object is to provide a promoted catalyst composition comprising a mixture of various hydrogenating metals in the form of their oxides or chromites, said composition having as a whole a catalytic effect in the various reactions to which it is applied greater than the sum of the effects of its constituent oxides or chromites.

These objects are accomplished by the following invention which, in its general aspects, comprises mixing or intimately associating a small amount of an oxide or chromite of one or more hydrogenating metals whose oxides are readily reducible with a chromite of one or more hydrogenating metals whose oxides are difficultly reducible. The invention also contemplates various combinations or mixtures of chromites of difficultly reducible hydrogenating metal oxides and easily reducible hydrogenating metal oxides, in widely varying proportions of the respective constituents.

In the following examples I have set forth in detail several catalyst compositions prepared in accordance with the principles of my invention, together with methods for their employment in various catalytic reactions, and also comparative data showing the improvement effected through their use. These examples are presented only for purposes of illustration and are not to be regarded as limitations.

*Example 1*

A cadmium promoted zinc chromite catalyst was prepared as follows: 62 grams of cadmium nitrate was dissolved in 150 cc. of water and added to a solution of 574 grams of crystallized zinc sulphate dissolved in two liters of water. To this mixed solution there was added with stirring 2.2 liters of neutral ammonium chromate solution containing 305 grams of $(NH_4)_2CrO_4$. Additional ammonium hydroxide was then added to bring the mixture to neutrality to litmus, after which the resulting precipitate was allowed to settle and the mother liquor was drawn off. After washing five times by decantation, the yellow precipitate of mixed basic zinc ammonium chromate and cadmium chromate was filtered and dried. In order to convert the chromates to chromites, the precipitate was heated in a muffle furnace for four hours at about 400° C. A spontaneous disintegration took place with the evolution of considerable heat, ammonia, and oxides of nitrogen, resulting in about a 25% loss in weight and leaving behind an almost black, powdery residue containing the oxides of zinc and cadmium partially combined with chromium sesqui-oxide in the form of chromites. The chromium was substantially all converted by the heating process from the hexavalent to the trivalent form. In order to give the promoted catalyst suitable form, it was compressed into tablets which were broken up and the grains screened to 6-14 mesh.

The activity of the above described catalyst was tested by employing it in the catalytic dehydrogenation of ethyl alcohol vapor at atmospheric pressure as follows: One cc. of the catalyst was placed in a glass reaction tube having a diameter of 15 mm. in such a manner as to form a disc shaped catalytic screen held in place with plugs of glass wool. The tube was heated at 400° C. and absolute ethanol vapor was passed therethrough at the rate of 50 cc. of liquid alcohol per hour. There was formed per hour 4.5 liters of gas measured at ordinary conditions of temperature and pressure, consisting of 5% ethylene and 95% hydrogen, representing a conversion of 1% of the alcohol to ethylene and water and 19.7% to acetaldehyde and hydrogen, or an overall conversion of about 20.7%.

By way of showing the improvement to be obtained by the addition of a small amount of cadmium to the above catalyst composition, a plain zinc chromite catalyst prepared by the method described, but without the use of cadmium, when employed in the same manner in the same testing equipment, gave only 3.5 liters of gas having the same composition as indicated above, representing a total conversion of the alcohol of only about 16%. It will be seen, therefore, that the addition of cadmium to the zinc chromite catalyst caused a 29% improvement in activity toward this particular reaction.

Example 2

A solution containing 190 grams of zinc nitrate and 12 grams of copper nitrate dissolved in one liter of water was treated with a solution prepared by dissolving 160 grams of ammonium chromate and 50 cc. of ammonium hydroxide in one liter of water. The resulting brownish yellow precipitate was filtered, dried without washing and ignited for two hours at 400° C. while being freely exposed to air, after which the residue weighed 155 grams. The bluish, black copper-zinc chromite resulting from the ignition was briquetted and screened to 6-14 mesh grains.

A copper-zinc chromite catalyst obtained as just described was employed for the catalytic synthesis of methanol from water gas containing 50% hydrogen, 34% carbon monoxide, 1.5% carbon dioxide and 7% of methane and nitrogen. A portion of the catalyst was placed in a pressure resisting tube and heated to 352° C. At this temperature the water gas was passed through the tube at the rate of 20,000 volumes of gas, measured at ordinary conditions of temperature and pressure, per unit volume of catalyst per hour and at a pressure of 267 atmospheres. There was formed per 100 cc. of catalyst per hour 136 cc. of crude condensate containing 90% pure methanol.

The improvement in activity due to the presence of the copper is shown by the fact that a plain zinc chromite catalyst prepared exactly as just described, but without the addition of copper, when employed in methanol synthesis under similar conditions of temperature, pressure, and gas composition, gave per 100 cc. of catalyst per hour only 114 cc. of crude condensate containing 86% methanol.

Example 3

A special study was made of the effect of cadmium, lead, and bismuth when incorporated separately into zinc chromite catalysts employed for the high pressure dehydrogenation of ethanol, wherein ethyl acetate is formed as the major product of the reaction.

The plain zinc chromite control catalyst and the three promoted zinc chromites containing the various metals just mentioned were all made in the same manner by precipitating 2-molar solutions of the base metal salts with an equivalent amount of 2-molar neutral ammonium chromate solutions, followed by neutralization with ammonia, washing by decantation, filtering, drying and igniting at 400° C.

The plain zinc chromite catalyst was prepared from zinc sulphate. The cadmium-zinc chromite composition was prepared from a solution containing 25 mole per cent cadmium nitrate and 75 mole per cent zinc sulphate. The lead-zinc chromite combination was prepared from a solulution containing 10 mole per cent lead nitrate and 90 mole per cent zinc nitrate. The bismuth-zinc chromite catalyst was prepared from a solution containing 10 mole per cent bismuth nitrate and 90 mole per cent zinc nitrate.

Test runs on each of the four catalysts were carried out as follows: 25 cc. of the catalyst undergoing investigation was loaded into a ½" cylindrical catalyst bed contained in a pressure resisting shell. Ninety-five per cent ethyl alcohol was vaporized and passed over the catalyst at a temperature of 400° C. and a pressure of 204 atmospheres, at the rate of 400 cc. of liquid alcohol per hour. The gaseous products were separated from the liquid components and the latter analyzed for ethyl acetate.

Disregarding such minor products as acetaldehyde, acetone, butanol, crotonyl alcohol, and esters higher in molecular weight than ethyl acetate, the following table shows the relative activities of the various catalysts as measured by the ester content of the condensate calculated as weight per cent of alcohol converted to ethyl acetate:

| Catalyst | Percent conversion of alcohol to ester |
|---|---|
| Zinc chromite (control) | 11.0 |
| Cadmium and zinc chromite | 15.0 |
| Lead and zinc chromite | 12.5 |
| Bismuth and zinc chromite | 14.5 |

It is to be noted that with each of the catalysts containing as a promoter a hydrogenating metal having a reducible oxide, the yield of ester is substantially greater than with zinc chromite alone.

Example 4

Maximum conversion of ethanol to ethyl acetate by high pressure dehydrogenation was obtained when a zinc chromite catalyst promoted with both copper and cadmium was employed in an elongated reaction tube heated by means of a vapor bath maintained at a carefully controlled temperature.

The catalyst was prepared by precipitating a mixed solution containing 82.5 mole per cent of zinc sulphate, 10 mole per cent copper sulphate and 7.5 mole per cent cadmium nitrate with a chemically equivalent amount of ammonium chromate freshly prepared from chromic acid and ammonia. The multiple chromates, containing also ammonium chromate, were washed, dried, and ignited at 400° C. to form a black powder containing the chromium oxide still uncombined with the base metals, but existing substantially in the trivalent form. This chromite material was briquetted, crushed, and screened to 14–18 mesh material.

Twenty-five cc. of the finely grained catalyst was loaded into a ¼" cylindrical cartridge which was placed in a vapor heated pressure resisting jacket. As in Example 3, ethyl alcohol was pumped therethrough at the rate of 400 cc. per hour. The catalyst temperature was maintained at 380° C. and the pressure at 204 atmospheres. The liquid condensate contained esters equivalent to a conversion to ethyl acetate of 25 weight per cent of the alcohol injected. In addition, the condensate contained a little acetaldehyde and acetone and 5.8% of material boiling above 100° C. consisting of about 25% 4-carbon alcohols, 23% acetic acid, 35% ethyl butyrate and butyl acetate and some higher boiling compounds.

The very high conversion of ethyl alcohol to ethyl acetate obtained was due to the extraordinary efficacy of the three-component chromite composition, containing a lesser amount of the chromites of two hydrogenating metals having easily reducible oxides and a greater amount of a chromite of a hydrogenating metal having a difficulty reducible oxide.

That the improvement obtained is not the average of the catalytic effects of the various constituent chromites of the composition, as would be expected from a consideration of the effects of the individual components when acting separately, is shown by the following table in which the conversions of the respective single chromites are given. It is also shown that no two-component chromite catalysts containing 10 mole per cent of the promoting chromites were equal in activity to the preferred three-component chromite catalyst of the above example. The tests were made in the same equipment and under the same conditions outlined above, and the catalysts were prepared by the same general method already described.

| Catalyst | Per cent conversion of alcohol to esters as ethyl acetate |
| --- | --- |
| Zinc chromite | 11.8 |
| Cadmium chromite | 10.8 |
| Copper chromite | 18.3 |

Example 5

Nickel and zinc ammonium chromates were prepared by dissolving 297 grams of zinc nitrate and 290 grams of nickel nitrate in 2.0 liters of water, adding a solution of 250 grams of ammonium bichromate and 350 cc. of ammonium hydroxide in two liters of water and heating to boiling. The resulting precipitate was washed, filtered, dried and heated to its spontaneous decomposition temperature, after which the resulting black residue was reduced in hydrogen at 300–475° C. The final composition contained 13% elementary nickel.

When used in liquid phase hydrogenation, 10 grams of this catalyst caused the rapid absorption of hydrogen by a solution of 100 grams of glucose in 100 cc. of water at a temperature of 150° C. and at a pressure of 1000 pounds. Sorbitol was formed quantitatively.

Example 6

A hydrogenation catalyst is prepared as follows: 23 grams of cadmium nitrate, 24 grams of copper nitrate, and 245 grams of zinc nitrate are dissolved in 500 cc. of water and mixed at ordinary temperature with an equal volume of water containing 126 grams of ammonium bichromate and 75 cc. of 28% ammonium hydroxide. After stirring, the mixture is exactly neutralized with additional ammonium hydroxide and allowed to settle. After several washes by decantation, the precipitate is dried, ignited at 400° C. and compressed into tablets or grains suitable for use in catalytic gas apparatus.

Twenty-five cc. of the mixed chromite catalyst prepared as above was loaded into an alloy steel reaction vessel capable of being heated and withstanding high pressures. The tube was fitted with a preheater, a pump for injecting liquid at a constant rate, a T connection for introducing hydrogen under pressure, a suitable condenser and trap for separating liquid products, and exit control valves.

A sample of 93% n-butyl n-butyrate was subjected to hydrogenation over the catalyst prepared as just indicated. The rate of flow was 700 cc. of ester per 100 cc. of catalyst per hour. The system was heated to 346° C. and maintained at a pressure of 2600–3600 pounds. The hydrogen-ester molecular ratio was 13.8. From 710 cc. of the butyrate so treated there was obtained by distillation 580 cc. of pure normal butanol boiling at 117° C., representing a conversion of the ester to butanol of approximately 73% of the theoretical.

Although in the above examples I have indicated certain definite conditions of temperature, pressure, gas velocity, amounts of materials, duration of reactions, etc., it is to be understood that any and all of these may be varied widely within the scope of my invention, since the particular conditions of operation are governed largely by the specific reaction, the materials treated, and the catalyst composition selected for a given reaction.

The promoted chromite catalysts, which are the subject of this invention, may be prepared by various methods. For example, they may be prepared by heating a mixture of compounds containing one or more hydrogenating metals whose oxides are reducible by hydrogen, one or more hydrogenating metals whose oxides are difficulty reducible or non-reducible by hydrogen and hexavalent chromium, to a temperature sufficient to cause the chromium to be reduced substantially to the trivalent form.

I may, for example, prepare a mixture of copper chromate and zinc chromate and ignite the mixture at a red heat, that is to say, a temperature of 600° C. or above, in order to drive off oxygen and form a mixture of copper oxide, zinc oxide, copper chromite and zinc chromite. A more convenient method consists of co-precipitating multiple chromates of the reducible and non-reducible oxides with ammonium chromate whereby double ammonium chromates are formed which decompose spontaneously and exothermically when heated to about 400° C.

By hydrogenating metals and oxides, I refer to those metals and oxides which are capable under proper conditions of serving as catalysts for the addition of hydrogen to such unsaturated compounds as ketones or olefins, or are capable of inducing the hydrogenation of alcohols in the vapor phase in preference to dehydration.

By difficultly reducible oxides, I refer to those which remain substantially in the oxide form after several hours' exposure in a pure state to the action of hydrogen at 400° C. Reducible oxides under the same conditions are readily converted to the elementary metal and water vapor. Suitable hydrogenating metals whose oxides are readily reducible are silver, copper, cadmium, lead, mercury, tin, bismuth, indium, iron, cobalt and nickel. Hydrogenating metals whose oxides are difficultly reducible are magnesium, zinc and manganese.

I have referred herein several times to promoters. By this term I refer to a metal or metals, either in the metallic state or in the form of an oxide or other compound, which is added to a simple hydrogenating metal chromite, such as zinc chromite, for the purpose of increasing its propensity to catalyze certain reactions, such as the hydrogenation or dehydrogenation of certain organic compounds. As indicated elsewhere, the effect of such addition in the case of the compositions forming the subject matter of this invention is to give the resulting composition a catalytic effect which is considerably greater than the sum of the effects of the various constituents. In other words, the catalytic effect of the catalyst is not merely the additive effect of these components.

According to the principles of my invention, a single metal having an easily reducible oxide may be used in conjunction with the simple chromites, or a plurality of such metals may be employed. Among those mentioned above, copper and cadmium are particularly useful, either when used alone or in combination. I have found that especially good results are obtained when a copper-cadmium-zinc chromite combination is employed.

The amount of promoter may be varied within wide limits. In general, I prefer to use much less reducible metal oxide than catalytic non-reducible oxide. Suitable concentrations are found between 1 and 25 mole per cent of the total base metal used. It is to be understood, however, that reducible oxides are not nearly so susceptible to reduction when combined wholly or in part with chromium oxide to form chromites as they are when not so combined. For example, a zinc chromite catalyst promoted with copper may be rather inert to reduction after which the copper is still contained largely in the oxide form.

The promoted chromite catalyst compositions which are the subject of this invention may be characterized as finely divided, refractory, dark colored powders containing chromium sesquioxide rather completely combined with a greater proportion of a hydrogenating metal whose oxide is difficultly reducible and a lesser proportion of a promoting hydrogenating metal whose oxide is easily reducible. Base metal oxides may or may not be present in excess of the amount necessary to form chromites with the chromium oxide. The term chromite as here used does not necessarily refer to a compound of definite chemical composition, since the chromites, in the sense of this invention, may contain widely differing proportions of their components and yet be substantially combined.

By means of acid extraction I have been able to prove that in these chromite compositions, compound formation exists between a part of the base metal oxides and the chromium sesquioxide. For example, zinc oxide is completely soluble in 10% acetic acid. Likewise, a catalyst mixture prepared by co-precipitation of zinc hydroxide and chromium hydroxide yields substantially all of its zinc oxide to such an acid extraction. On the other hand, when zinc chromite containing an excess of zinc oxide and prepared by igniting zinc ammonium chromate was extracted with dilute acetic acid, the residual product contained 41% of zinc oxide in the form of an acid resistant chromite compound. The same phenomenon is observed with mixed chromites and demonstrates the chemical nature of the product. The hydrogenating metal may exist, for example, either in the metallic form, or as an oxide, or both. The chemical relationships of the various elements of the composition depend to a certain extent upon the methods of preparation and reduction employed.

I have disclosed above several methods of preparation of promoted chromite catalysts, including the heating to their spontaneous decomposition temperature of mixtures of certain double ammonium chromates of various hydrogenating metals.

The promoted chromite catalyst compositions of my invention are applicable to a wide variety of catalytic reactions, but particularly to those involving hydrogenation or dehydrogenation of organic or other carbon compounds. They are particularly suitable for the dehydrogenation of alcohols at ordinary or higher pressures, the catalytic hydrogenation of esters under pressure to form the corresponding alcohols, the synthesis of methanol and higher alcohols from oxides of carbon and hydrogen, the hydrogenation of aldehydes or ketones under pressure, and the conversion of carbon monoxide and steam to carbon dioxide and hydrogen (the water gas reaction).

As many apparently and widely different embodiments of this invention may be made without departing from the spirit and scope thereof, it is to be understood that I do not limit myself to the specific embodiments thereof except as defined in the appended claims.

I claim:

1. A process of forming a catalyst composition which comprises precipitating from an aqueous medium with a chromate of a nitrogen base a mixture of metal chromates, at least one of which is a chromate of a hydrogenating metal whose oxide when exposed for several hours in the pure state to the action of hydrogen at 400° C. will remain substantially in the oxide form and another of which is a chromate of a hydrogenating metal whose oxide when exposed for several hours in the pure state to the action of hydrogen at 400° C. will be reduced substantially to the metal, and converting the said mixture of metal chromates into one containing the corresponding metal chromites.

2. A process of forming a catalyst composition which comprises co-precipitating from an aqueous medium a mixture of double chromates of several hydrogenating metals with a nitrogen base, at least one of which is a double chromate of a hydrogenating metal whose oxide when exposed for several hours in the pure state to the action of hydrogen at 400° C. will remain substantially in the oxide form and another of which is a double chromate of a hydrogenating metal whose oxide when exposed for several hours in the pure state to the action of hydrogen at 400° C. will be reduced substantially to the metal, and converting said mixture of chromates into one containing the corresponding metal chromites.

3. The process in accordance with claim 1 characterized in that the nitrogen base is ammonia.

4. A process of forming a catalyst composition which comprises co-precipitating from an aqueous medium a mixture of double chromates of ammonia and several hydrogenating metals, at least one of which is a double chromate of a hydrogenating metal whose oxide when exposed for several hours in the pure state to the action of hydrogen at 400° C. will remain substantially in the oxide form and another of which is a double chromate of a hydrogenating metal whose oxide when exposed for several hours in the pure state to the action of hydrogen at 400° C. will be reduced substantially to the metal, and heating the said mixture of double ammonium chromates to its spontaneous decomposition temperature, thus converting the same into a mixture containing the corresponding metal chromites.

5. A process of forming a catalyst composition which comprises precipitating from an aqueous medium with a chromate of a nitrogen base a mixture of copper and zinc chromates, and converting said mixture into one containing the corresponding metal chromites.

6. A process of forming a catalyst composition which comprises co-precipitating from an aqueous medium a mixture of double chromates of ammonia with zinc and copper, and heating said precipitate to its spontaneous decomposition temperature, thus converting the same into a mixture containing the corresponding metal chromites.

7. A process of forming a catalyst composition which comprises precipitating from an aqueous medium with a chromate of a nitrogen base a mixture of zinc and cadmium chromates, and converting said mixture into one containing the corresponding metal chromites.

8. A process of forming a catalyst composition which comprises co-precipitating from an aqueous medium a mixture of double chromates of ammonia with zinc and cadmium, and heating said precipitate to its spontaneous decomposition temperature, thus converting the same into a mixture containing the corresponding metal chromites.

9. A process of forming a catalyst composition which comprises precipitating from an aqueous medium with a chromate of a nitrogen base a mixture of zinc, copper, and cadmium chromates, and converting said mixture into one containing the corresponding metal chromites.

10. A process of forming a catalyst composition which comprises co-precipitating from an aqueous medium a mixture of double chromates of ammonia with zinc, copper, and cadmium, and heating said precipitate to its spontaneous decomposition temperature, thus converting the same into a mixture containing the corresponding metal chromites.

11. A catalyst comprising essentially an intimately associated mixture of hydrogenating metal chromites, said catalyst being obtained by the process which comprises precipitating from an aqueous medium with a chromate of a nitrogen base a mixture of metal chromates, at least one of which is a chromate of a hydrogenating metal whose oxide when exposed for several hours in the pure state to the action of hydrogen at 400° C. will remain substantially in the oxide form and another of which is a chromate of a hydrogenating metal whose oxide when exposed for several hours in the pure state to the action of hydrogen at 400° C. will be reduced substantially to the metal, and converting the said mixture of metal chromates into one containing the corresponding metal chromites.

12. A catalyst comprising essentially an intimately associated mixture of hydrogenating metal chromites, said catalyst being obtained by the process which comprises co-precipitating from an aqueous medium a mixture of double chromates of several hydrogenating metals with a nitrogen base, at least one of which is a double chromate of a hydrogenating metal whose oxide when exposed for several hours in the pure state to the action of hydrogen at 400° C. will remain substantially in the oxide form and another of which is a double chromate of a hydrogenating metal whose oxide when exposed for several hours in the pure state to the action of hydrogen at 400° C. will be reduced substantially to the metal, and converting said mixture of chromates into one containing the corresponding metal chromites.

13. A catalyst comprising essentially an intimately associated mixture of hydrogenating metal chromites, said catalyst being obtained by the process which comprises precipitating from an aqueous medium with a chromate of ammonia a mixture of metal chromates, at least one of which is a chromate of a hydrogenating metal whose oxide when exposed for several hours in the pure state to the action of hydrogen at 400° C. will remain substantially in the oxide form and another of which is a chromate of a hydrogenating metal whose oxide when exposed for several hours in the pure state to the action of hydrogen at 400° C. will be reduced substantially to the metal, and converting the said mixture of metal chromates into one containing the corresponding metal chromites.

14. A catalyst comprising essentially an intimately associated mixture of hydrogenating metal chromites, said catalyst being obtained by the process which comprises co-precipitating from an aqueous medium a mixture of double chromates of ammonia and several hydrogenating metals, at least one of which is a double chromate of a hydrogenating metal whose oxide when exposed for several hours in the pure state to the action of hydrogen at 400° C. will remain substantially in the oxide form and another of which is a double chromate of a hydrogenating metal whose oxide when exposed for several hours in the pure state to the action of hydrogen at 400° C. will be reduced substantially to the metal, and heating the said mixture of double ammonium chromates to its spontaneous decomposition temperature, thus converting the same into a mixture containing the corresponding metal chromites.

15. A catalyst comprising essentially an intimately associated mixture of zinc and copper chromites, said catalyst being obtained by the process which comprises precipitating from an aqueous medium with a chromate of a nitrogen base a mixture of copper and zinc chromates, and converting said mixture into one containing the corresponding metal chromites.

16. A catalyst comprising essentially an intimately associated mixture of zinc and copper chromites, said catalyst being obtained by the process which comprises co-precipitating from an aqueous medium a mixture of double chromates of ammonia with zinc and copper, and heating said precipitate to its spontaneous decomposition temperature, thus converting the same into a mixture containing the corresponding metal chromites.

17. A catalyst comprising essentially an intimately associated mixture of zinc and cadmium chromites, said catalyst being obtained by the process which comprises precipitating from an aqueous medium with a chromate of a nitrogen base a mixture of zinc and cadmium chromates, and converting said mixture into one containing the corresponding metal chromites.

18. A catalyst comprising essentially an intimately associated mixture of zinc and cadmium chromites, said catalyst being obtained by the process which comprises co-precipitating from an aqueous medium a mixture of double chromates of ammonia with zinc and cadmium, and heating said precipitate to its spontaneous decomposition temperature, thus converting the same into a mixture containing the corresponding metal chromites.

19. A catalyst comprising essentially an intimately associated mixture of zinc, copper, and cadmium chromites, said catalyst being obtained by the process which comprises precipitating from an aqueous medium with a chromate of a nitrogen base a mixture of zinc, copper, and cadmium chromates, and converting said mixture into one containing the corresponding metal chromites.

20. A catalyst comprising essentially an intimately associated mixture of zinc, copper, and cadmium chromites, said catalyst being obtained by the process which comprises co-precipitating from an aqueous medium a mixture of double chromates of ammonia with zinc, copper, and cadmium, and heating said precipitate to its spontaneous decomposition temperature, thus converting the same into a mixture containing the corresponding metal chromites.

WILBUR A. LAZIER.